May 13, 1952 — A. L. STONE — 2,596,828
APPARATUS FOR MOVING PIPE
Filed June 13, 1949 — 2 SHEETS—SHEET 1

Albert L. Stone
INVENTOR.
BY
AGENT.

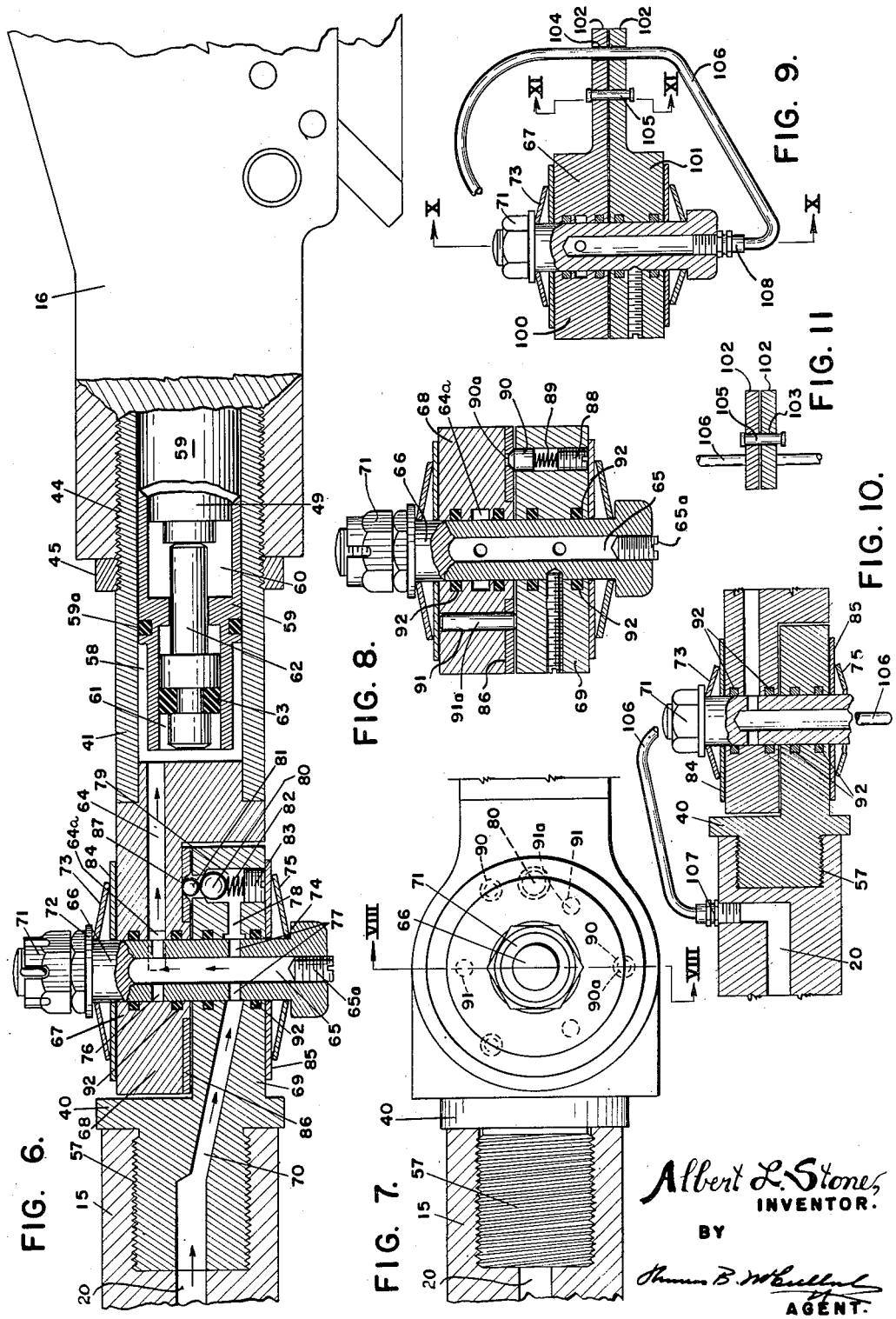

UNITED STATES PATENT OFFICE 2,596,828

APPARATUS FOR MOVING PIPE

Albert L. Stone, Redondo Beach, Los Angeles, Calif., assignor, by mesne assignments, to Standard Oil Development Company, Elizabeth, N. J., a corporation of Delaware Application June 13, 1949, Serial No. 98,740

13 Claims. (Cl. 214—1)

The present invention is directed to apparatus adapted for moving and handling pipe.

The device of the present invention is particularly adapted for use in a derrick for controlling the movement of stands of pipe in the derrick. This device is adapted to be used for controlling the movement of either the upper or lower end of a stand of pipe having its axis substantially vertical as the stand is moved from the center of the derrick to one side of the derrick and from the rack to the center of the derrick. The apparatus of the present invention is an improvement over the apparatus disclosed in my copending application U. S. Serial No. 690,946, filed August 16, 1946, and entitled "Apparatus for Moving Pipe," now U. S. Patent 2,537,607, issued January 9, 1951. In the referred to application, the invention is specifically directed to the combination of the base member and an elongated member comprising a hook member while the present invention is specifically directed to a combination of an elongated member comprising a hook assembly, and a bearing on the end of the hook assembly which cooperates with a hinged joint in the elongated member to provide safety features for causing the hook assembly to unload and release excessive loads which may be put onto the assembly such as by failure of pipe elevators to retain the load and to release the load to the hook assembly comprising the present invention.

In many industrial operations, it is necessary to handle a great many lengths of tubing or pipe in a rapid, efficient manner. As an example of such an operation, in the drilling of wells by the rotary drilling method, it is frequently necessary to withdraw the entire length of drill stem from the borehole and subsequently replace the drill stem in the borehole. In deep boreholes, many lengths of pipe must be handled in the operation of withdrawing the drill stem from the hole and in the operation of returning the drill stem to the hole. In such conventional operations, it is common to raise the drill stem so that three joints of pipe, known as a stand, are above the surface of the earth, to unscrew the threaded connection joining the lower end of the stand to the remainder of the drill stem, then stack the disconnected stand in one side of the derrick. It has heretofore been the practice to station a man in the derrick, called the derrick man, who is assigned the task of grasping the upper end of each stand of pipe and controlling the movement of the upper end when a stand is being moved over into racking position. It has also been conventional for a member of the crew on the derrick floor to control the movement of the lower end of each stand as it is being placed in the rack.

The apparatus of the present invention comprises a hook assembly adapted to engage with a stand of drill pipe having its axis substantially vertical when the stand is in the center of a derrick or when the stand has been racked in a derrick adjacent other stands of pipe. The apparatus also includes means for extending or retracting the hook along an axis at right angles with the axis of the stand of pipe grasped by the equipment. The apparatus further includes a feature which allows the hook assembly when subjected to predetermined excessive loading to define an arcuate movement which actuates a pressure releasing means which allows the hook to open and to release the stand of pipe.

The apparatus of the present invention specifically includes a safety hinge as an integral part of an extensible and retractable hook for moving pipe, whose function is to prevent damage to the hook assembly and other associated equipment by allowing arcuate movement of the hook in the direction of excessive loads while simultaneously releasing the pipe. It will be seen then that the invention particularly is concerned with apparatus for moving vertical lengths of pipe and which is provided with safety features which prevent damage to the hook by overloading.

It is, therefore, the main object of the present invention to provide an improved apparatus involving a safety hinge for moving pipe.

Another object of the invention is to provide apparatus including an extensible and retractable arm including a hook which embodies a hinge member which will describe an arcuate movement under excessive loading.

A still further object of the invention is to provide a hook assembly for moving pipe including means for releasing the pipe when the assembly is excessively loaded.

Still another object of my invention is to provide an improved hydraulic apparatus embodying an arm carrying a hook including a hinge member which will describe an arcuate movement under excessive loading and which will cause release of hydraulic pressure therefrom.

Other objects will become apparent from a reading of the following detailed description taken with the drawing.

The principal parts of the apparatus of the present invention are a threaded tubular member 15 mounted in upwardly projecting housings 12, 13 and 14. Attached to threaded member 15 is a hook assembly 16 comprising a tubular body portion 41 and a hinge 67. The hinge 67 comprises a pin 66 and portions 68 and 69 which rotate about pin 66. An important feature of the hinge 67 is a pressure releasing member which may either be a safety valve or a shearable conduit, which will be described in more detail.

The device of the present invention will now be described in more detail in conjunction with the drawing, in which Fig. 1 is a top elevation showing an embodiment of the present invention;

Fig. 3 is a view of the apparatus of Fig. 2 taken along the line III—III;

Fig. 6 is a sectional top view of the hinged portion of the apparatus of the present invention;

Fig. 7 is a side view in partial section of the apparatus of the present invention;

Fig. 8 is a sectional view taken along the lines VIII—VIII of Fig. 7;

Fig. 9 is a sectional view of a preferred embodiment of the hinged portion of the apparatus of the present invention;

Fig. 10 is a sectional view of the apparatus of Fig. 9 taken along the line X—X; and Fig. 11 is a view of the apparatus of Fig. 9 taken along the line XI—XI.

Figure 1:
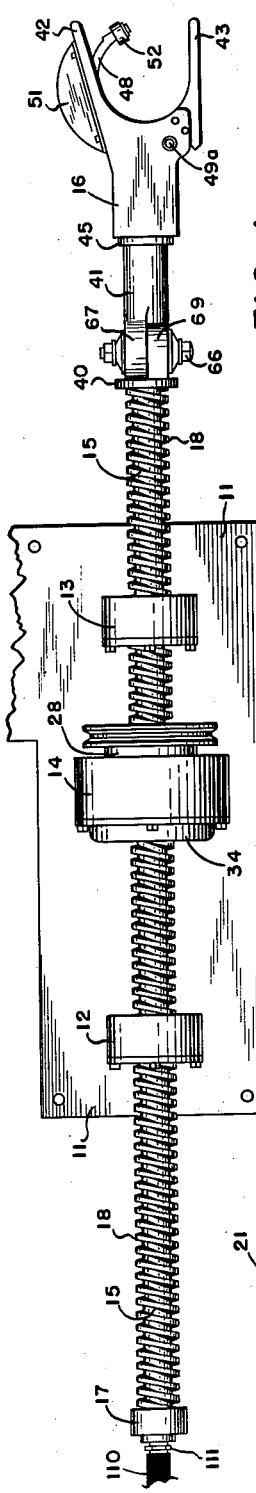
Figure 2:
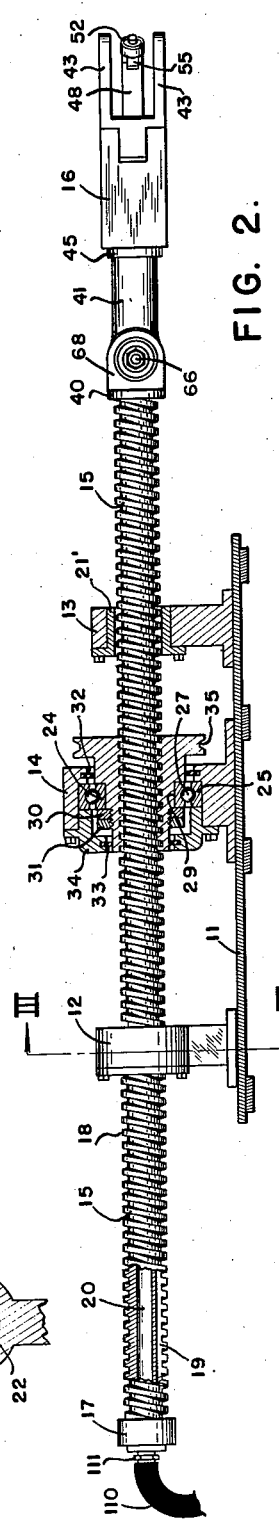
Fig. 2 is an elevation partly in section taken at right angles to the view of Fig. 1.
Figure 5:
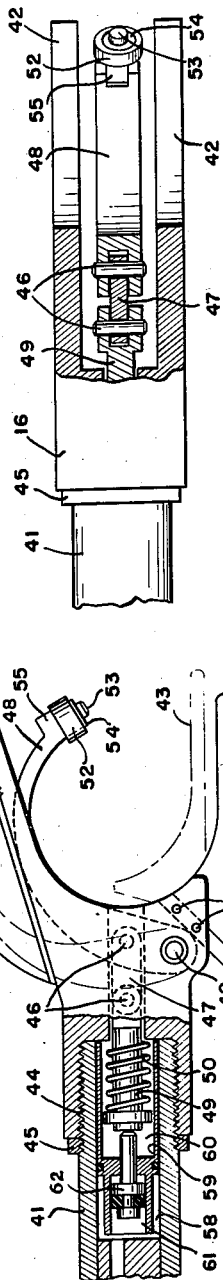
Fig. 5 is a side view partially in section taken at right angles to Fig. 4.

Turning now specifically to the drawing, and especially to Fig. 1, plate 11 has mounted thereon housings 12, 13 and 14. These housings are adapted to support a threaded tubular member 15. A hook member 16 is mounted on one end of member 15 and a stop member 17 is mounted on the other end.

It will be seen that the exterior surface of the major portion of member 15 defines a screw thread 18. A keyway 19 extends along the underside of member 15 parallel with the axis of the tubular member and a central passage 20 extending the full length thereof.

Housing 12 defines a laterally extending opening in which is mounted a bushing 21 arranged for embracing the outside surface of square cut threads 18 thereby serving to support member 15. Housing 13 is similarly provided with an opening in which is mounted a bushing 21'. The interior of bushing 21 defines keyway 22 having key 23 positioned therein arranged for slidable engagement with keyway 19 defined by member 15. In other words, the assembly mounted in housing 12 is adapted to cooperate with the outer surfaces defined by thread 18 to support rod member 15 and with the key 23 to prevent rotation of member 15.

The housing 14 is positioned between housings 12 and 13 and serves as the mounting means for an assembly adapted to move rod member 15 longitudinally. Housing 14 is bored of a diameter such that it will receive a bearing assembly comprising ball races 24 and 25 and bearings 27. A member 28 of a generally tubular shape and having its interior threaded to mate with threads 18 is mounted for rotation in the housing 14. Member 28 defines a surface 29 which makes a sliding fit in ball race 24 and is provided with threads on which is screwed ring 30 which contacts with ball race 24 and a second ring 31 which acts as a lock ring. Entry of foreign materials into the bearing assembly is prevented by closure 32 which is positioned between housing 14 and member 28 and closure 33 which is positioned between member 28 and cover plate 34. The end of member 28 adjacent closure 32 extends outside the closure and has the configuration of a pulley with a groove 35 which provides the driving surface, for example, with a conventional V-shape belt.

It will be seen that by providing a suitable rotating means for member 28, it may be rotated in one direction which will cause the hook 16 of the member 15 to be moved away from the base plate and in the opposite direction to withdraw hook 16 toward the base plate. The movement of member 15 is limited in one direction by contact of shoulder 40 with bushing 21' and in the opposite direction by contact of stop member 17 with bushing 21.

Hook member 16 comprises a body 41 having a generally annular shape adapted to be secured to the end of tubular member 15 and having a bifurcated portion defining members 42 and 43. It will be understood that member 16 may be attached to body 41 in any suitable manner. In the drawing, member 16 is shown as attached to body 41 by screw threads 44 and is retained in position by a lock nut 45.

Arranged within the recess formed by the bifurcated section of member 16 are crosshead member 49, link 47, and jaw member 48 connected by pins 46 to form a linkage allowing jaw member 48 to move arcuately about pin 49a with lineal movement of crosshead member 49.

Crosshead piece 49 is encircled by spring member 50 and may be actuated against the spring by hydraulic fluid in a manner which will be described. As hydraulic fluid is introduced into the central passage 20 which extends the length of member 15, spring 50 is compressed as will be described and member 49 bears against link 47 causing jaw member 48 to be moved about the pin 49a by a crank action motion and thus causing the hook or jaw member 48 to be moved inwardly toward member 43 causing a stand of pipe to be enclosed and grasped by member 48 and member 43. Similarly, release of hydraulic fluid from passage 20 releases the force exerted on spring 50 which causes the hook or jaw member 48 to move outwardly in the open position as shown by the dotted lines. Jaw member 48 retracts into a cover member 51 which is designed as a safety guard to prevent damage to personnel when it projects from the enclosure defined by member 42.

Arranged on the end of member 48 is a roller 52 which is held in place by a pin 53 resting on a shoulder 54. Pin 53 may be externally threaded to engage with internal threads in bushing 55 to allow roller 52 to be secured thereto. Roller 52 is designed to rotate freely on pin 53 as a tangential force is exerted against it. Thus, when a stand grasped by the hook is raised or lowered the roller 52 rotates and substantially reduces the force on the hook due to friction, thereby preventing a normal operating force from acting on the safety hinge. This feature is important in preventing damage to the hook assembly by sudden loading due to dropping a stand of pipe and exerting a force against member 16. This feature is also important in combination with other necessary features of my apparatus which will be described in more detail hereinafter.

Figure 4:
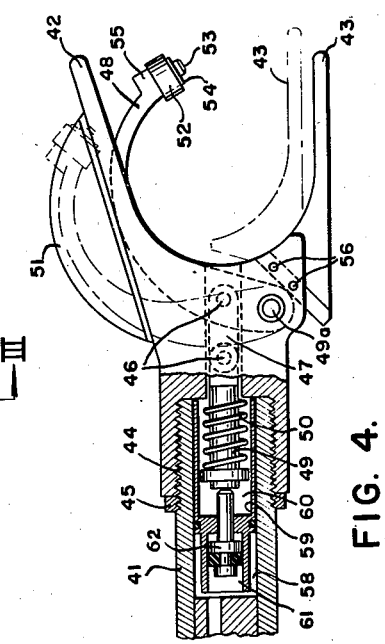
Fig. 4 is a top view partially in section showing the arrangement of the hook.

Member 43 is provided with set screws 56 and is designed so that it may be arranged as shown in Fig. 4 or moved inwardly as shown by the dotted lines in Fig. 4 to include a smaller space than that shown by the full lines. Thus, by manipulation of set screws 56 it may be possible to widen or narrow the enclosure defined by jaw members 42 and 43 to accommodate larger or smaller stands of pipe as required.

Referring now to Figures 4 and 6 it will be seen that body member 41 is connected to hook 16 by threads 44 and tubular member 15 by threaded connection 57. Body member 41 is of tubular structure and defines a chamber 58 in which is arranged a sleeve 59 which in turn defines a first chamber 60 in which is arranged crosshead piece 49 and spring 50. Sleeve 59 also defines a second chamber 61 which is open to chamber 58 and arranged therein is a piston member 62 which projects into chamber 60 and bears frictionally against crosshead piece 49. Piston member 62 comprises a pack off ring 63 to prevent passage of hydraulic fluid around the piston and to allow pressure to be exerted against piston 62. Sleeve 59 is also provided with packing 59a to insure a seal.

It will be apparent that chamber 58 is in fluid communication with passageway 64 defined by tubular body member 41 which in turn fluidly communicates with a vertical passageway 65 defined by pin 66. Passageway 65 is closed by a set screw 65a. Tubular body member 41 is constructed to define a hinge 67 which pivots around pin 66 in a manner which will be described.

Hinge 67 is defined by portion 68 of body member 41 which defines passageway 64 and portion 69 which includes threaded connection 57 and shoulder 40. Portion 69 defines a passageway 70 which is in fluid communication with central passageway 20, vertical passageway 65 and thus with passageway 64 and chamber 58 and 61. It will be immediately apparent that introduction of a hydraulic fluid into passageway 20 will cause pressure to be exerted against piston 62 and thence against crosshead piece 49 arranged in sleeve 59 and in turn will actuate the hook assembly 16 as has been described.

Pin 66 in hinge 67 is secured by a lock nut 71 which rests on a washer 72 which in turn engages with a spring 73 and exerts force against the hinge 67. Pin 66 protrudes through hinge 67 and defines a shoulder 74 that bears frictionally against a second spring member 75 which serves to hold portions 68 and 69 of body member 41 defining the hinge 67. Pin 66 also defines lateral passageways 76 and 77 communicating, respectively, with passageways 64 and 70 and also with passageway 78, the latter passageway terminating in a chamber 79 defined by portion 69 of hinge 67. Passageway 64 is provided with a partial ring groove 64a extending 180° so that fluid may be released from passageways 65 and 64 in rotation of portion 68 as will be described further. From the foregoing description taken with the drawing, central passage 20 and passageway 70 define a first passageway, passageway 64 and chamber 58 define a second passageway, and pin 66 defines a third passageway 65. The pin 66 also defines passageways 76 and 77, the former being part of the second passageway and serving to communicate with the third passageway while the latter forms part of the first passageway and serves to communicate with the third passageway.

Arranged in chamber 79 is a valve member including spheres 80 and 81 and spring 73 resting on set screw 83 which closes the chamber 79 from the atmosphere. It will be noted that springs 73 and 75 rest, respectively, on plates 84 and 85 and that the latter serves as a cover plate for screw 83. Between the two portions 68 and 69 of hinge 67 is a hardened plate 86 which defines a recess 87 to accommodate sphere 81 when the hinge 67 is in the inoperative position.

Referring now to Figs. 7 and 8 it will be seen that hinge portion 69 defines three chambers each housing a spring 89 under compression which is resisted in one direction by set screw 88 permitting adjustment, and in the opposite direction by plug 90 which bears against tapered hole 90a defined by hardened plate 86. The mechanism in the three chambers embodies a locking device which serves to maintain the hinge 67, member 15 and hook 16 in longitudinal alignment except under conditions of excessive loading of hook 16. The plug 90 bears against plate 86 and serves to resist rotation of the plate 86 in a downward direction.

Portion 68 of hinge 67 and hardened plate 86 define aligning holes 91 which contain pins 91a to prevent relative rotation between these two members.

As the portion 68 of hinge 67 and hardened plate 86 rotate with respect to portion 69 of hinge 67, plug 90 is forced against spring 89 as the tapered holes in plate 86 become misaligned, thus creating a resistance to initial relative rotation between portions 68 and 69 of hinge 67.

Simultaneously with the aforementioned action tapered hole 87 of hardened plate 86 becomes misaligned with chamber 79 causing spherical body 81 to move against spherical body 80 and compress spring 82 thereby releasing hydraulic fluid from passageway 65 through the resulting opening in chamber 79. This removes force against crosshead member 49 and spring 50 moves this linkage and thus opening jaw member 43.

It will be apparent that pin 66 is provided with packing rings 92 to provide a seal.

Referring now to Figures 9, 10, and 11, a preferred embodiment of the hinge 67 will be described in which a simpler means than the safety valve including spherical bodies will be described. In this embodiment, it will be apparent that the hinge 67 is constructed of a top section 100 and a bottom section 101, each of which is provided with a projecting flange portion 102 defining passageways 103 and 104. Arranged in passageway 103 is a shear pin 105 and arranged in passageway 104 is a shearable conduit 106. Shearable conduit 106 is connected to passageway 20 by a screw plug connection 107 and in turn is connected to passageway 65 in pin 66 by a screw plug connection 108. Thus, shearable conduit 106 connects passageway 20 with passageway 65 and replaces the safety valve in the portion 69 of the embodiment of Figure 6. It will be obvious that the embodiment of Figures 9, 10, and 11 is simpler to construct and maintain than the embodiment of Figure 6 and has fewer operating parts, and, therefore, is more efficient than the embodiment of Figure 6.

In operating the apparatus of the present invention hydraulic fluid may be introduced into central passageway 20 from a source not shown through flexible conduit 110 connecting member 15 to a source of fluid under pressure. Conduit 110 may be secured to member 15 by a coupling or union 111 to make a pressure tight connection. As the hydraulic fluid is introduced into passageway 20 it flows therethrough and thence into passageways 70, 65, 64 and finally into chambers 58 and 61 where its pressure is exerted against piston 62 which is forced against crosshead piece 49. Crosshead piece 49 in moving forward compresses spring 50 and actuates jaw member 48 through pins 46 and link 47 by a crank action motion well understood by the skilled workman. This causes jaw member 48 to move inwardly and embrace a stand of pipe which may be moved into position or engaged by movement of the assembly 15 carrying the hook assembly 16. If the stand of pipe embraced by the jaw member 48 should suddenly load the hook member 16, the roller 52 on the end of jaw member 48 would rotate minimizing frictional drag. At the same time the vertical loading of the assembly would cause an arcuate movement of portion 68 of hinge 67 about pin 66 which would cause release of hydraulic fluid in the device of Figures 6 and 7 through the spaces between portions 68 and 69 thereof or would cause release of fluid by shearing pin 105 and conduit 106 in the preferred embodiment of Figures 9, 10, and 11. The release of fluid in the devices of Figures 6, 7, and 8 is accomplished by arcuate movement of the hinge 67 about pin 66. As hinge portion 68 rotates downwardly with respect to portion 69 the plate 86 also rotates moving the sphere 81 downward against sphere 80 opening the chamber 79 to the atmosphere through the spaces shown between portions 68 and 69 and thus causing release of fluid from the first passageway to the third passageway and from the second to the third passageway which allows the spring 50 to move piston 62 to the left and thus opening jaw member 48 which releases the load. As the fluid pressure is released the jaw member 48 would be retracted into an open position by release of pressure on spring 50 as pressure is relaxed on crosshead piece 49, thus allowing the stand of pipe to be dropped without causing damage to the hook assembly.

In operating the apparatus of the present invention hydraulic fluid may be introduced into central passageway 20 by means of a conduit 110 connecting member 15 to a source of hydraulic fluid under pressure. Conduit 110 may be secured to member 15 by a coupling or union 111 to make a pressure tight connection. As the hydraulic pressure is introduced into the passage 20 it flows therethrough and thence into vertical or perpendicular passage 65 defined by the pin 66 and thence into the chamber 60 enclosing piston 62 and cross piece member 49. The hydraulic pressure exerted against piston 62 and cross piece 49 causes springs 50 to be compressed and, through pins 46 and link 47 by a crank action motion which will be well understood by the skilled workman, causes jaw member 48 to be moved inwardly to enclose a stand of pipe which may be moved into position or engaged by movement of the assembly 15. It will be seen, therefore, that the combination of the elongated member, the hook assembly, the roller bearing, the hinged joint and the pressure releasing means cooperate to provide a safety feature of the apparatus of my invention.

The hydraulic fluid employed in my apparatus may be either a liquid or gaseous fluid. For example, a highly refined hydrocarbon oil in the lubricating oil boiling range may be employed as hydraulic fluid. Alternatively, the hydraulic fluid may be a gaseous material such as compressed air; in fact, compressed air may be desirable since sudden release of a liquid such as hydrocarbon oil may dump oil on workmen working adjacent to or below the assembly of the present invention.

The nature and objects of the present invention having been completely described and illustrated, what I wish to claim as new and useful and secure by Letters Patent is:

1. Apparatus for grasping and moving pipe comprising, in combination, a base member and a retractive member having a free end, said base member being adapted to support said retractive member, a hook member on the free end of said retractive member, said hook member defining a hinge adapted to define an arcuate movement about an axis perpendicular to that of said retractive member on operation thereof, said retractive member defining a passageway operably communicating with and adapted to deliver fluid pressure to said hook member, and a pressure releasing means fluidly communicating with said passageway adapted to be actuated by and to release fluid pressure on arcuate movement of said hinge.

2. A device in accordance with claim 1 in which the pressure releasing means is a valve.

3. A device in accordance with claim 1 in which the pressure releasing means is a shearable conduit.

4. A device adapted for grasping and releasing an object having a cylindrical surface comprising, in combination, an elongated member defining a first passageway, a hook assembly comprising a tubular member defining a second passageway, said hook assembly being mounted on a free end of said elongated member, a first element fixed with respect to the tubular member defining a first end with the surface thereof substantially parallel with the axis of the tubular member and laterally displaced away from the outer surface of said tubular member, a movable member mounted for arcuate movement about an axis perpendicular to that of the tubular member and having a second end adapted to be moved toward and away from said first end, a hinged joint in said tubular member defining a third passageway fluidly communicating with first and second passageways, and pressure releasing means fluidly communicating with said third passageway.

5. A device in accordance with claim 4 in which the pressure releasing means is a valve.

6. A device in accordance with claim 4 in which the pressure releasing means is a shearable conduit.

7. A device adapted for grasping and releasing an object having a cylindrical surface comprising, in combination, an elongated member defining a first passageway, a hook assembly comprising a tubular member defining a second passageway, said hook assembly being mounted on a free end of said elongated member, a first element fixed with respect to the tubular member defining a first end with the surface thereof substantially parallel with the axis of the tubular member and laterally displaced away from the outer surface of said elongated member, a movable member mounted for arcuate movement about an axis perpendicular to that of the tubular member and having a second end adapted to be moved toward and away from said first end, a hinged joint arranged in said hook assembly defining a third passageway fluidly communicating with said first and second passageways, and a valve in said elongated member positioned adjacent to and in communication with said third passageway and an exterior surface of said hook assembly and operative by arcuate movement of said hinged joint.

8. A device adapted for grasping and releasing an object having a cylindrical surface comprising, in combination, an elongated member defining a first passageway, a hook assembly comprising a tubular member defining a second passageway, said hook assembly being mounted on a free end of said elongated member, a first element fixed with respect to the tubular member defining a first end with the surface thereof substantially parallel with the axis of the tubular member and laterally displaced from the outer surface of said tubular member, a movable member mounted for arcuate movement about an axis perpendicular to that of the elongated member and having a second end adapted to be moved toward and away from said first end, a hinged joint arranged in said hook assembly defining a third passageway fluidly connected with said first and second passageways and a valve assembly fluidly connected with said third passageway and an exterior surface of said hook assembly and actuated by arcuate movement of said joint.

9. A device adapted for grasping and releasing an object having a cylindrical surface comprising, in combination, an elongated member defining a first passageway, a hook assembly comprising a tubular member defining a second passageway, said hook assembly being mounted on a free end of said elongated member, a first element fixed with respect to the tubular member defining a first end with the surface thereof substantially parallel with the axis of the tubular member and laterally displaced away from the outer surface of said tubular member, a movable member mounted for arcuate movement about an axis perpendicular to that of the tubular member and having a second end adapted to be moved toward and away from said first end, a pin in said elongated member defining a third passageway perpendicular to and fluidly communicating with said first and second passageways, a hinged joint defining slidable surfaces pivotally movable about said pin, and pressure releasing means fluidly communicating with said third passageway.

10. A device in accordance with claim 9 in which the pressure releasing means is a valve.

11. A device in accordance with claim 9 in which the pressure releasing means is a shearable conduit.

12. A device adapted for grasping and releasing an object having a cylindrical surface comprising, in combination, an elongated member defining a first passageway, a hook assembly comprising a tubular member defining a second passageway, said hook assembly being mounted on a free end of said elongated member, a first element fixed with respect to the tubular member defining a first end with the surface thereof substantially parallel with the axis of the tubular member and laterally displaced away from the outer surface of said tubular member, a movable member mounted for arcuate movement about an axis perpendicular to that of the tubular member and having a second end adapted to be moved toward and away from said first end, a roller bearing mounted on said second end, a pin in said elongated member defining a third passageway perpendicular to and fluidly communicating with said first and second passageways, a hinged joint defining slidable surfaces pivotally movable about said pin, and a valve arranged adjacent to and fluidly communicating with said third passageway and an exterior surface of said hook assembly and operative by arcuate movement of said hinged joint.

13. A device adapted for grasping and releasing an object having a cylindrical surface comprising, in combination, an elongated member defining a first passageway, a hook assembly comprising a tubular member defining a second passageway, said hook assembly being mounted on a free end of said tubular member, a first element fixed with respect to the tubular member defining a first end with the surface thereof substantially parallel with the axis of the tubular member and laterally displaced away from the outer surface of said elongated member, a movable member mounted for arcuate movement about an axis perpendicular to that of the tubular member and having a second end adapted to be moved toward and away from said first end, a roller bearing mounted on said second end, a pin in said elongated member defining a third passageway perpendicular to and fluidly communicating with said second passageway, a hinged joint defining slidable surfaces pivotally movable about said pin, means to exert tension against said hinged joint and to maintain said slidable surfaces in frictional relationship to each other, a flange member arranged on the exterior of said hinged joint and defining passageways adapted to receive a shear pin and a conduit, a shear pin arranged in one of said passageways in said flange member and a shearable conduit means arranged in another of said passageways in said flange member defining a pressure releasing means fluidly communicating with said first and third passageway.

ALBERT L. STONE.

REFERENCES CITED

The following references are of record in the file of this patent:

UNITED STATES PATENTS

| Number | Name | Date |
| --- | --- | --- |
| 2,162,653 | Umphres | June 13, 1939 |
| 2,290,247 | Perkins | July 21, 1942 |